United States Patent [19]
Haddad, Jr.

[11] Patent Number: 5,803,528
[45] Date of Patent: Sep. 8, 1998

[54] TRUCK COVER

[75] Inventor: Edward N. Haddad, Jr., Worcester, Mass.

[73] Assignee: Pioneer Consolidated Corporation, North Oxford, Mass.

[21] Appl. No.: 675,573

[22] Filed: Jul. 3, 1996

[51] Int. Cl.⁶ .................................................. B60P 7/04
[52] U.S. Cl. ............................................ 296/100; 296/98
[58] Field of Search ........................... 296/98, 100, 101; 160/67, 68, 69, 71, 72, 78, 80

[56] References Cited

U.S. PATENT DOCUMENTS

| | | | |
|---|---|---|---|
| 783,587 | 2/1905 | Nicewaner | 160/265 |
| 1,468,832 | 9/1923 | Parsons | 160/265 |
| 1,750,285 | 3/1930 | Schuler | 160/71 |
| 1,751,735 | 3/1930 | Hicinbothem | 160/265 |
| 1,827,059 | 10/1931 | Woolcott | 296/105 |
| 2,594,597 | 4/1952 | Taylor | 296/100 |
| 2,668,586 | 2/1954 | Luckie | 160/241 |
| 2,959,447 | 11/1960 | Stebbins et al. | 296/65.1 |
| 3,041,104 | 6/1962 | Richard | 296/100 |
| 3,416,834 | 12/1968 | Morse, Jr. | 296/100 |
| 3,549,197 | 12/1970 | Sibley | 296/100 |
| 3,549,199 | 12/1970 | Sibley | 296/100 |
| 3,628,826 | 12/1971 | Sibley | 296/98 |
| 3,656,802 | 4/1972 | White | 296/100 |
| 3,833,255 | 9/1974 | Logue | 296/101 |
| 3,841,697 | 10/1974 | McFarland | 296/100 |
| 3,910,629 | 10/1975 | Woodard | 296/101 |
| 3,942,830 | 3/1976 | Woodard | 296/105 |
| 3,964,781 | 6/1976 | Fenton | 296/100 |
| 3,975,047 | 8/1976 | McClellan | 296/100 |
| 4,023,857 | 5/1977 | Killion | 296/98 |
| 4,027,911 | 6/1977 | Johnson | 296/161 |
| 4,030,780 | 6/1977 | Petretti | 296/100 |
| 4,032,186 | 6/1977 | Pickering et al. | 296/100 |
| 4,046,416 | 9/1977 | Penner | 296/98 |
| 4,050,734 | 9/1977 | Richard | 296/98 |
| 4,088,234 | 5/1978 | Smith | 414/525.55 |
| 4,095,840 | 6/1978 | Woodard | 296/100 |
| 4,116,152 | 9/1978 | Larsson | 114/106 |
| 4,189,178 | 2/1980 | Cramaro | 296/105 |
| 4,203,174 | 5/1980 | Shults | 4/502 |
| 4,216,990 | 8/1980 | Musgrove et al. | 296/213 |
| 4,295,262 | 10/1981 | Grote et al. | 29/462 |

(List continued on next page.)

FOREIGN PATENT DOCUMENTS

| | | |
|---|---|---|
| 1060927 | 8/1979 | Canada . |
| 1146768 | 4/1963 | Germany . |
| 3139303 | 8/1982 | Germany . |
| 1733288 | 5/1992 | U.S.S.R. . |
| 2178499 | 2/1987 | United Kingdom . |

OTHER PUBLICATIONS

"Tarper™", C–Wil–Meyer Fabricating, Inc., Rt.3, Box 34B, Seymour, WE 54165, advertisement, 4 pgs. Apr. 12, 1991.

"The Hydra Cover™", Pioneer Cover–All™, Pioneer Consolidated Corp., advertisement, 2 pgs. Apr. 12, 1991.

Primary Examiner—Andrew C. Pike
Attorney, Agent, or Firm—Weingarten, Schurgin, Gagnebin & Hayes LLP

[57] ABSTRACT

For a truck having an upwardly open container and a support structure, a truck cover system is securable to the support structure and capable of drawing a flexible cover over the container. In an exemplary embodiment, the truck cover system includes a pair of nonlinear arms, movable in unison from a first position to a second position. Each of the arms includes an elongate base member slidably engaged with an elongate extension member wherein the extension member has a first elongate portion disposed at an obtuse angle with respect to a second elongate portion, the second elongate portion of the extension member being substantially parallel, noncoaxial, and in slidable engagement with the base member. The first elongate portion of the extension member is secured to the first end of the flexible cover. The truck cover system further includes first and second actuators associated with each of the nonlinear arms to move the arms from the first position to the second position.

20 Claims, 6 Drawing Sheets

U.S. PATENT DOCUMENTS

| | | | |
|---|---|---|---|
| 4,341,416 | 7/1982 | Richard | 296/98 |
| 4,469,317 | 9/1984 | Grote et al. | 269/69 |
| 4,494,707 | 1/1985 | Niibori et al. | 242/390.2 |
| 4,516,802 | 5/1985 | Compton | 296/98 |
| 4,518,194 | 5/1985 | Kirkham et al. | 296/100 |
| 4,627,658 | 12/1986 | Vold et al. | 296/100 |
| 4,640,331 | 2/1987 | Braun et al. | 152/417 |
| 4,740,029 | 4/1988 | Tuerk | 296/100 |
| 4,842,323 | 6/1989 | Trickett | 296/98 |
| 4,874,196 | 10/1989 | Goldstein et al. | 296/98 |
| 5,238,287 | 8/1993 | Haddad, Jr. | 296/98 |
| 5,292,169 | 3/1994 | O'Brian | 296/98 |

5,803,528

TRUCK COVER

FIELD OF THE INVENTION

The present invention relates to truck cover systems, and more particularly to a truck cover system for maintaining a cover in close proximity to a container.

BACKGROUND OF THE INVENTION

Flexible covers are placed over open truck-borne containers for many reasons including protection of the contents of the container and prevention of the contents from being blown out of the container while the truck is in transit. Although containers can be covered by manually operated cover mechanisms, mechanical devices are known that assist in positioning a cover over an open truck container.

One type of mechanical covering device includes telescopic arms comprising two nested arm segments that are extended or retracted by piston-like actuators as the arms are pivoted fore and aft to pull a cover over or retract a cover from the top of a container. The nested arm segments, however, must remain relatively straight and undented to telescope properly and not bind. When damaged, this type of telescopic arm is not readily useable or repairable.

SUMMARY OF THE INVENTION

In accordance with the invention, a truck cover system is provided that is durable and easily maintained. The truck cover system is securable to a support structure and includes a pair of arms which move from a first position to a second position to draw a flexible cover over an upwardly open container having an opening defined by an upper edge.

In an exemplary embodiment, the truck cover system includes a pair of nonlinear arms, movable in unison from a first position to a second position. Each of the arms includes an elongate base member slidably engaged with an elongate extension member wherein the extension member has a first elongate portion disposed at an obtuse angle with respect to a second elongate portion. The second elongate portion of the extension member is substantially parallel, noncoaxial, and in slidable engagement with the base member. The first elongate portion of the extension member is secured to a first end of the flexible cover. The truck cover system further includes first and second actuators associated with each of the nonlinear arms to move the arm from the first position to the second position.

BRIEF DESCRIPTION OF THE DRAWINGS

Other features and advantages of the invention will be apparent from the following detailed description of the invention in conjunction with the accompanying drawings, in which.

DETAILED DESCRIPTION

Figure 1:
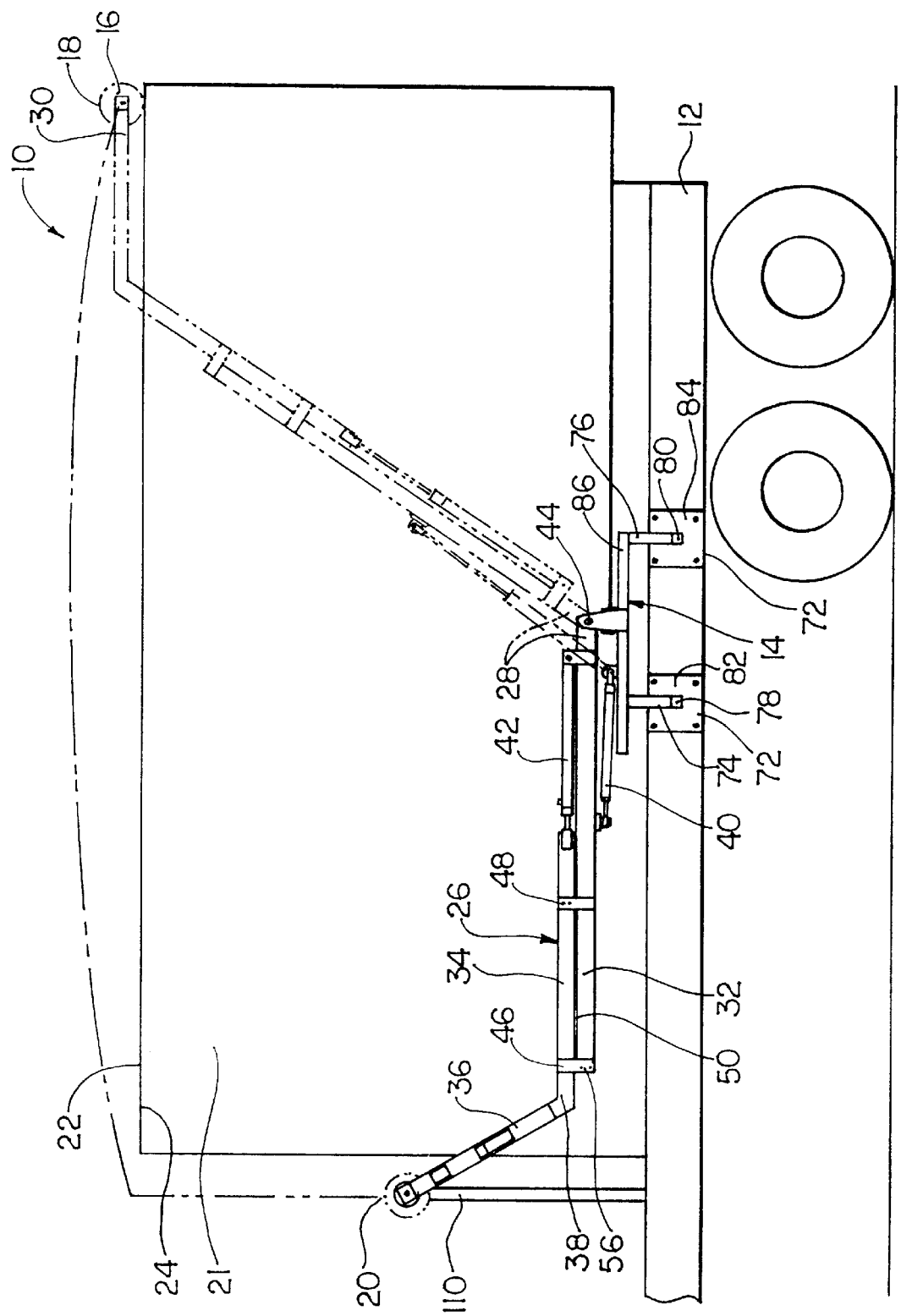
FIG. 1 is a side view of a truck cover system illustrating arm movement to cover a truck container.
Figure 6:
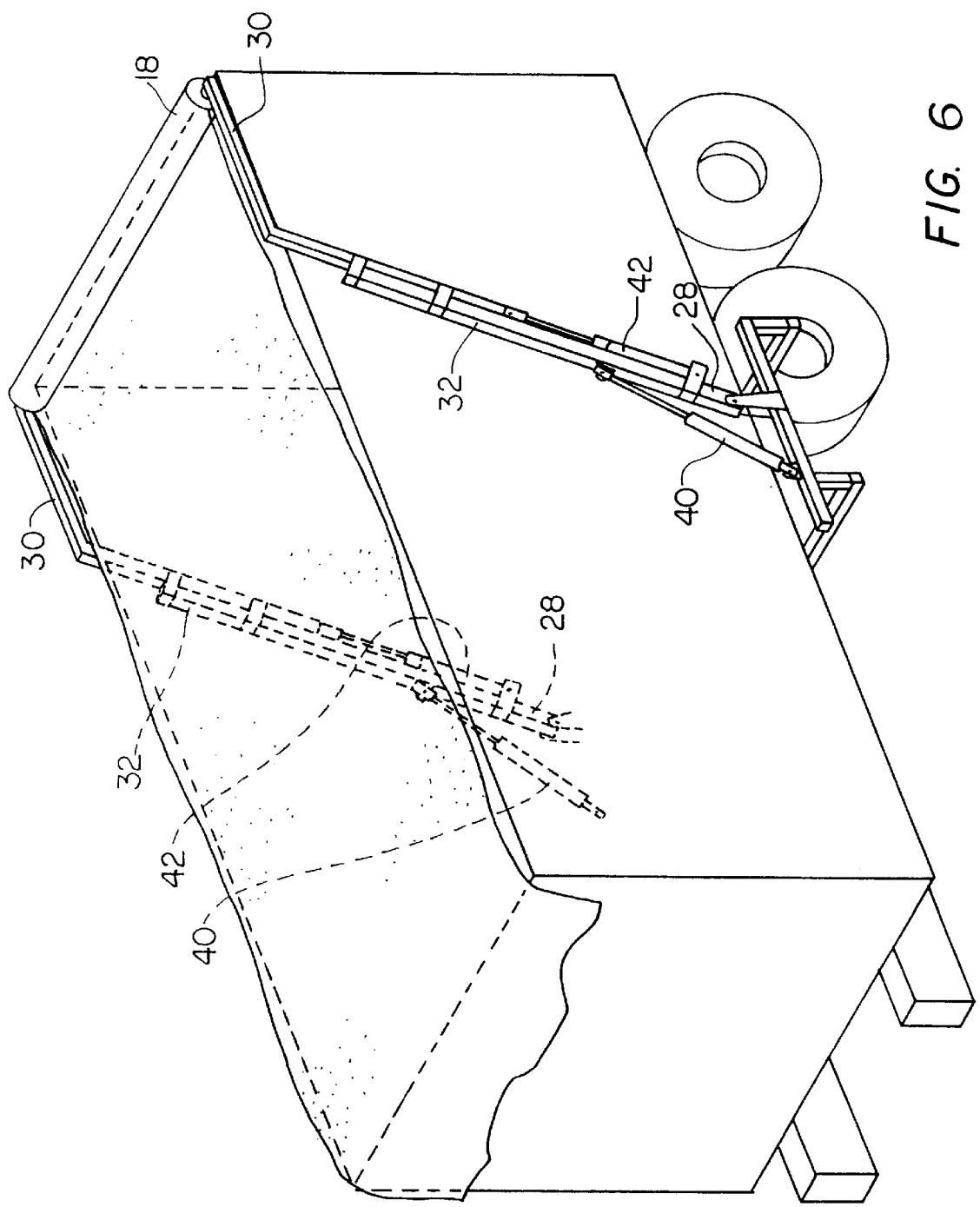
FIG. 6 is a view of the truck cover system illustrating both arms of the apparatus.

FIG. 1 and FIG. 6 illustrate a durable and easily maintainable truck cover system. The truck cover system includes arms which provide easy visual and mechanical access to system components for rapid inspection and replacement thereof. The arms are extendable to enable containers of different sizes to be covered, as well as to control a travel path for a flexible cover. The structure of the arms allows long and short containers to be completely covered. Also, the arms may be adjusted to accommodate some arm and container distortion. It will be appreciated that the arms may be linear or nonlinear.

Figure 2:
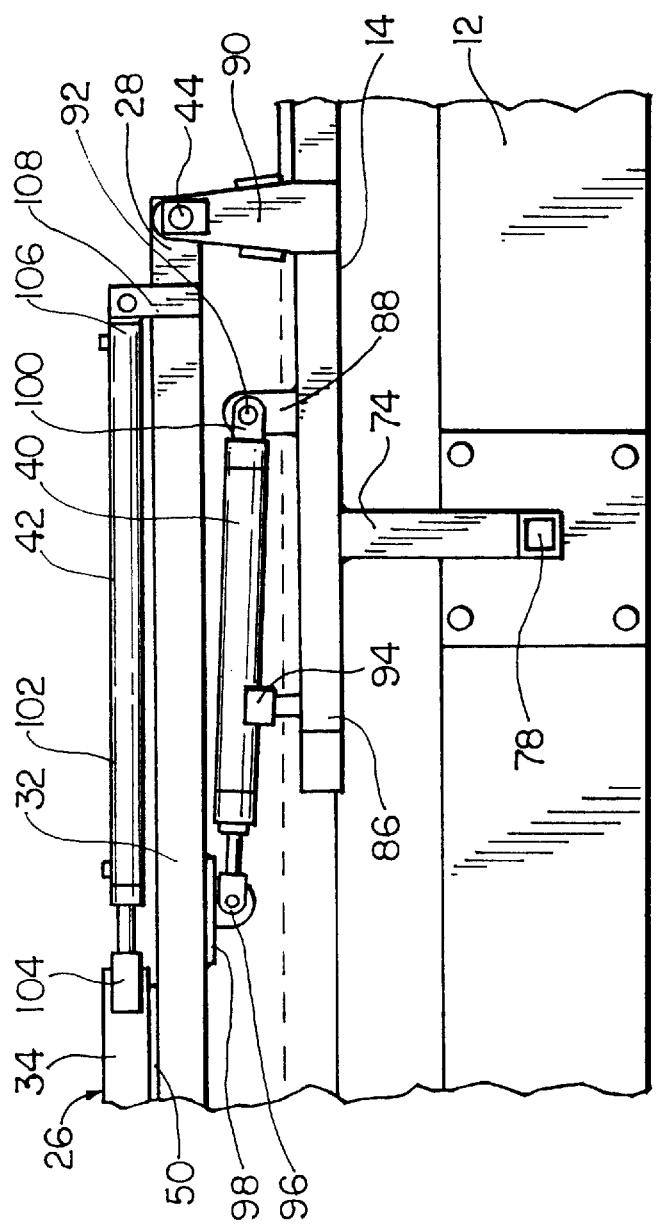
FIG. 2 is detailed view of arm elements of the truck cover system of FIG. 1.

FIGS. 1 and 2 illustrate a truck cover system 10 secured to a truck frame 12 by a support structure 14. The device is symmetrical, therefore for simplicity sake, only a single side is shown in the drawings, though it should be understood that the other side contains similar structure and operates in a similar manner. The truck cover system 10 is capable of drawing a flexible cover 16 having a first end 18 and a second end 20 over a container 21 having an opening 22 defined by an upper edge 24 of the container. The truck cover system 10 includes a pair of nonlinear arms 26 each having a first end 28 engaged with the support structure 14 and a second end 30 secured to the first end 18 of the cover 16. It will be appreciated that the word "end", as used herein, refers to a general vicinity and not a precise location. The arms 26 each include an elongate base member 32 slidably engaged with an elongate extension member 34. The extension member 34 includes a first elongate portion 36 disposed at an obtuse angle with respect to a second elongate portion 38. The base member 32 and the extension member second portion 38 are slidably engaged in a parallel, noncoaxial arrangement with a slide strip 50 disposed therebetween. The base member 32 and extension member 34 are each rigid and resistant to deformation thus providing a durable mechanism for covering a truck container opening 22. The base and extension members 32,34 can be solid or hollow, but as will be appreciated, in comparison with telescoping segments which require minimal wall thickness to accommodate sequential overlapping segments and therefore limited damage resistance, hollow base and extension member wall thicknesses can be made significantly thicker. Also, as the slidable relationship between the base member 32 and extension member 34 is adjustable as discussed below, the arms 26 can withstand some distortion of the arm and also of the container 21.

In an exemplary embodiment, each of the arms 26 includes a first actuator 40 linking the support structure 14 to the base member 32 and a second actuator 42 linking the base member 32 and the extension member 34. The first and second actuators 40,42 move the arms 26 in unison from a first position to a second position. The arms 26 are pivotally secured at respective arm pivot points 44 and caused to pivot about the arm pivot points by the first actuator 40 and are extended and retracted by the second actuator 42. The supporting structure 14 is affixed to the truck frame 12 for supporting the arms 26, thus not using space required by a structure secured to a truck bed. The arms 26 are adapted to maintain the cover 16 in close proximity to the container upper edge 24 as the cover 16 covers the container 21. The container 21 shown is a roll-off container, but other containers having an opening defined by an upper edge may be covered as well.

The arms 26 further include a first retainer 46 and a second retainer 48 for maintaining the base member 32 and the extension member second portion 38 slidably engaged. The first retainer 46 and the second retainer 48 are adjustable to accommodate arms of differing size. Arms formed from tubing, such as steel tubing, may have relatively loose dimensional tolerances. Thus, each order of tubing may have varying actual dimensions. The adjustable first and second retainers 46,48 allow base and extension members 32,34 of varying size to be movably confined, while providing appropriate tension for proper extension of the arm 26. This configuration also allows an operator to view the arm components more easily than in a traditional telescoping arm configuration.

Figure 3:
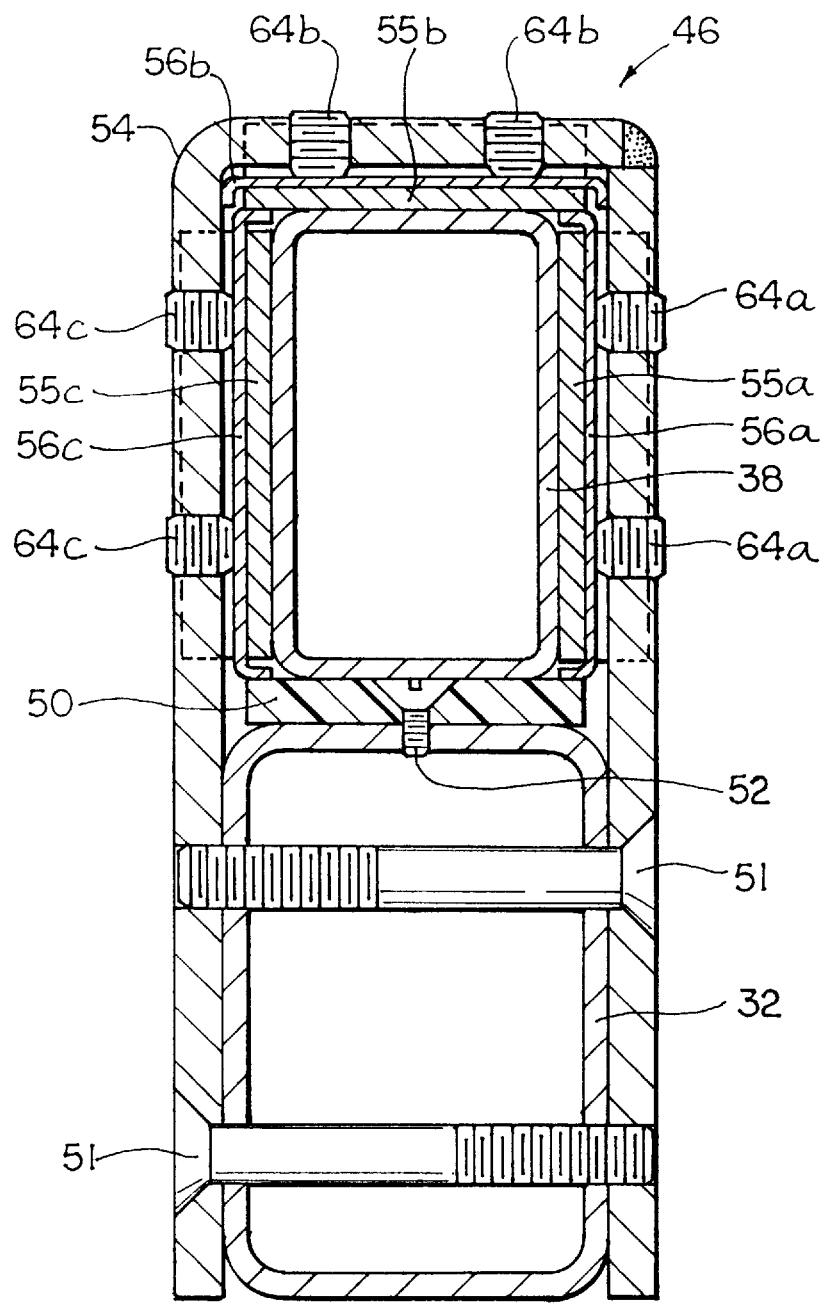
FIG. 3 is a front sectional view of a first retainer.
Figure 4:
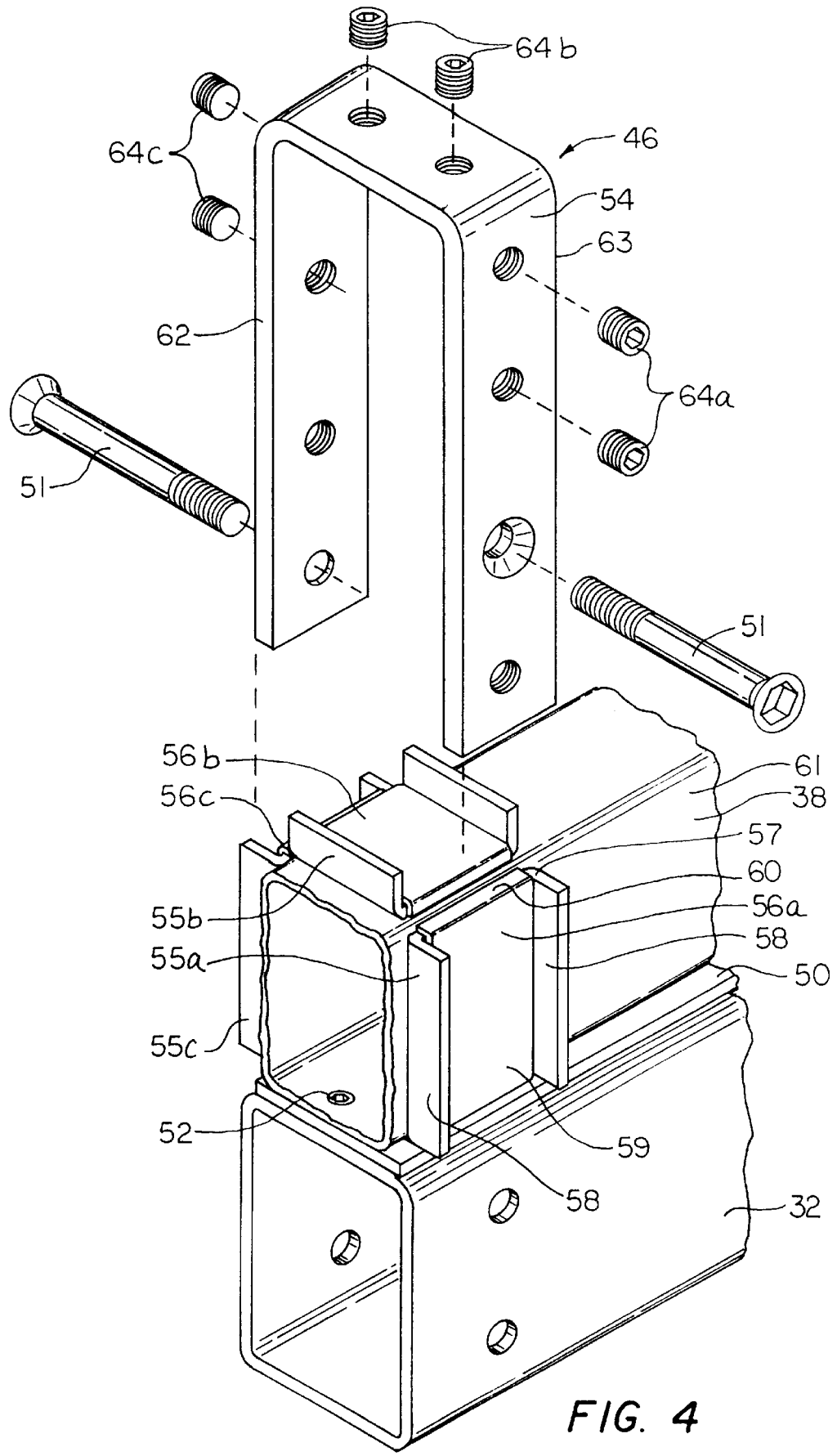
FIG. 4 is a perspective partially exploded view of the first retainer of FIG. 3.

As shown in FIGS. 3 and 4, the first retainer 46 is secured to the base member 32 by retainer bolts 51 and the slide strip 50 is affixed to the base member 32 by slide strip screws 52. Other means known to one skilled in the art may be used to secure the slide strip or retainers such as welding, bonding, or glue.

The first retainer 46 includes a bracket 54, channels 55*a–c*, and corresponding back-up plates 56*a–c*. The channel 55*a* includes a channel base portion 57 and opposing channel side portions 58 substantially perpendicular to the base portion. The back-up plate 56*a* includes a back-up base portion 59 and opposing back-up plate side portions 60. The channel side portions 58 and back-up plate side portions 60 are arranged so that the channel base portion 57 abuts the back-up plate base portion 59. The channel base portion 57 confronts a first surface 61 of the extension arm second portion 38. The channel side portions 58 extend to edges of first and second faces 62,63 of the bracket 54. The back-up plate side portions 60 conform to the height of the channel base portion 57, thus capturing the channel 55*a* and back-up plate 56*a* within the first retainer 46. The channel 55*a* and the back-up plate 56*a* are "U"-shaped in this embodiment, as shown in FIG. 4.

Set screws 64*a* impinge upon the back-up plate 56*a* to increase a pressure applied to the extension member second portion 38 by the channel 55*a*. The set screws 64*a* are used to adjust the pressure thereby varying the force required to move the extension member 34 with respect to the base member 32. This arrangement accommodates arms of differing dimensions.

Similarly, channels 55*b*,55*c* are joined with a respective backup plate 56*b*,56*c*, and held captive within the first retainer 46. The back-up plates 56*b*,56*c* are manipulated by set screws 64*b–c*. The channels 55*a–c* and the slide strip 50 surround a portion of the extension member second portion 38 to maintain the slidable engagement of the base member 32 and the extension member 34.

As shown the base member 32 is wider than the extension member 34, but other embodiments are contemplated wherein the base member width or height is equal to or larger than the extension member width or height, with the first and second retainers shaped in conformance therewith. It will also be appreciated that the base or extension members may be of a shape other than rectangular, circular for example, without departing from the spirit of the invention.

Figure 5:
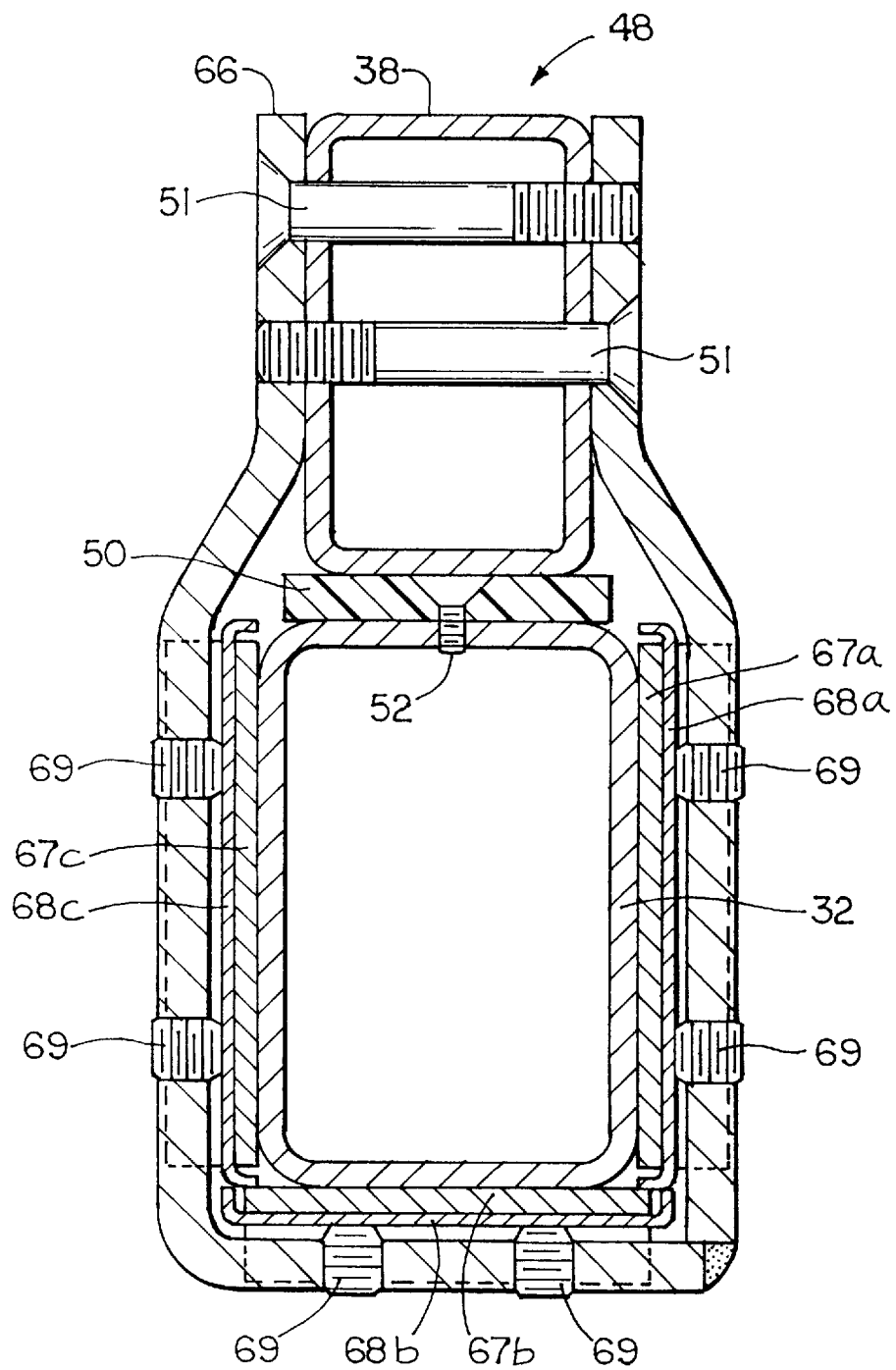
FIG. 5 is a front sectional view of a second retainer.

Referring now to FIG. 5, the second retainer 48 similarly includes a bracket 66 shaped to conform to the base member 32 and the extension member second portion 38 widths, wherein the second retainer 48 is affixed to the extension member by retainer bolts 51. The second retainer 48 includes channels 67*a–c* which are mated with a corresponding back-up plate 68*a–c* and held captive within the second retainer. Set screws 69 impinge upon the back-up plates 68*a–c* to adjust a pressure applied to the base member 32 wherein the sides of the base member are surrounded by respective channels 67*a–c* and slide strip 50.

The slide strip 50 and channels 55*a–c* are formed from an Ultra High Molecular Weight (UHMW) material such as polyethylene which allows relatively unencumbered axial movement of the extension member 34 with respect to the base portion 32. This arrangement obviates the need for regular lubrication as is necessary for telescoping arms, a messy and environmentally less desirable situation. The slide strip 50 is rectangular in shape in the preferred embodiment, but is not limited thereto. A slide strip can include a series of UHMW portions disposed lengthwise with respect to the arm, or horizontally. Other configurations are contemplated to be within the scope and spirit of the invention. It will also be appreciated that other suitable materials known in the art to provide the desired durability and frictional resistance may be used.

In the exemplary embodiment of FIGS. 1 and 2, the supporting structure 14 is secured to the truck frame 12 at two attachment points 72, on each side of the truck frame. The supporting structure 14 includes first and second vertical beams 74,76 and associated horizontal beams 78,80 extending from respective base portions 82,84 which are affixed to the truck frame 12 at the two attachment points 72. The first and second vertical beams 74,76 are affixed to a support beam 86. Also affixed to the support beam 86 is a first post 88 having a pivot point 92 and a second post 90. The supporting structure 14 further includes a yoke 94 secured to the supporting beam 86. The supporting structure 14 configuration provides a solid foundation to which the arms 26 are attached, and does not use any space that may be needed by a container. The supporting structure 14 can be removably attached to the truck frame 12 allowing the entire truck cover system 10 to be removed or attached in a different location on the truck frame.

The first actuator 40 for causing the arms 26 to pivot includes a first hydraulic cylinder 94 in an exemplary embodiment, but is not limited thereto. For example, servomotors, pneumatic systems, or other means known to one skilled in the art may be used. The first cylinder 94 includes a first end 96 affixed to the base member 32 at a first point 98, and a second end 100 pivotally attached to the first post pivot point 92. The second activator 42 includes a second cylinder 102 having a first end 104 affixed to the extension member 34 and a second end 106 pivotally secured to a support post 108 which is affixed to the base member 32. In an exemplary embodiment, the first cylinder 94 has a stroke of about twenty-four inches to accommodate the required range of motion from the first position to the second position. The second cylinder 102 for extending and retracting the arms has a stroke of about thirty inches. As can be seen, the second cylinder 102 operates to provide axial movement of the extension member second portion 38 with respect to the base member 32. Movement of the arms 26 as a whole does not affect the relationship of the base member 32 with respect to the extension member 34, since the second cylinder 102 is affixed at the first end 104 to the extension member and to the base member 32 at the second end 106 through the support post 108. Thus, the second cylinder 102 is not stressed by any lateral movement of the arms 26.

In an exemplary embodiment, the cover 16 is cradled by a fixed length gantry 110 which holds the cover second end 20 in place allowing the arms 26 to extend the cover over the opening 22. A telescoping gantry may be used to enable containers of different heights to be accommodated by the truck cover system. The gantry 110 is affixed to the truck frame 12 at a point in front of where the container 21 is placed.

The container 21 is shown in an uncovered state and a covered state with the path defined by the cover 16 shown in phantom. The arms 26 transition from the first position wherein the arms are disposed alongside the truck frame 12 and the container 21 is uncovered, to the second position wherein the arms have rotated so that the cover substantially covers the container opening 22 and the base member 34 has transitioned from a first position which is substantially parallel with the truck frame 12, to a second position wherein the base member 34 is at an obtuse angle with respect to the truck frame 12. The nonlinear extension member 34, in conjunction with radial movement with respect to the base member 32, increases the reach of the arms 26 so that a longer container may be completely covered while increasing durability of the overall truck cover system 10.

In the first position, the first and second cylinders 94,102 are compressed. To begin the transition from the first position to the second position, the first cylinders 94 begin extending, thereby causing the base member 32 to begin to rotate about the arm pivot points 44. Simultaneously, the second cylinders 102 extend so that the arm first ends 28 move in a substantially vertical direction until the height of the container 21 is reached by the cover 16. The expansion of the second cylinders 102 causes axial movement of the extension members 34 with respect to the base members 32 thus increasing the length of the arms 26. When the cover 16 attains the height of the container 21, the second cylinders 102 contract such that the cover is maintained in close proximity to the container upper edge 22. After the cover 16 has partially covered the container opening 22, the second cylinders 102 expand, thereby extending the arms 26 length by causing axial movement of the extension members 34 with respect to the base members 32. As the length of the arms 26 increase, the reach of the extension arms increase to allow the cover 16 to travel the length of the container 21, thereby covering the container opening 22 in its entirety. The first cylinders 94 expand continuously during transition from the first position to the second position.

In an exemplary embodiment, during a transition from the first position to the second position, the cover 16 defines an arcuate motion so as to allow the cover to pass over a mound of matter within the container that rises above the container upper edge 22. Loaded containers often have such a mound which presents a problem for a cover system where the cover moves horizontally along the container upper edge. However, many possible paths for the cover are possible with the present invention that is capable of defining many different curvatures, including a substantially horizontal path. Containers of many different heights, lengths, and widths may be accommodated without departing from the scope and spirit of the presently claimed truck cover system. Other alternative configurations of the illustrated embodiments may also be made, but still remain within the scope of the claims.

What is claimed is:

1. For a truck having a support structure and an upwardly open container with an opening defined by a container upper edge, a truck cover system securable to the support structure and capable of drawing a flexible cover having a first end and a second end over the container, the truck cover system comprising:

a pair of arms, each of said arms having a first end engaged with said support structure and a second end secured to said first end of said flexible cover, each of said arms being movable in unison from a first position to a second position, each of said arms including an elongate base member slidably engaged with an elongate extension member, said extension member of each arm being substantially parallel and noncoaxial with respect to said base member of each arm, said first end of said flexible cover being secured to a first end of said extension member of each arm;

a first actuator associated with each of said arms, each said first actuator of each arm linking said support structure to said elongate base member of each of said arms and being actuatable to move said arms from said first position to said second position; and a second actuator associated with each of said arms, each said second actuator of each arm linking said elongate base member with said elongate extension member of each arm and being actuatable to move said elongate extension member of each arm longitudinally with respect to said elongate base member of each arm.

2. The truck cover system according to claim 1, wherein each of said arms further includes a slide strip disposed between said base member and said extension member of each of said arms.

3. The truck cover system according to claim 1, wherein each of said arms further includes a first retainer affixed to a first end of said base member of each arm for retaining said base member and said extension member of each arm in slidable engagement.

4. The truck cover system according to claim 3, wherein each said first retainer includes at least one channel formed from Ultra High Molecular Weight material for slidably confining a portion of each said extension member.

5. The truck cover system according to claim 4, wherein each said first retainer further includes at least one back-up plate in mechanical communication with said at least one channel of each arm, wherein said at least one back-up plate impinges upon said at least one channel to adjust a tension applied to said extension member of each of said arms.

6. The truck cover system according to claim 5, wherein said at least one channel and said at least one back-up plate are "U"-shaped and joined wherein said at least one channel and said at least one back-up plate are captive within said first retainer.

7. For a truck having a support structure and an upwardly open container with an opening defined by a container upper edge, a truck cover system securable to the support structure and capable of drawing a flexible cover having a first end and a second end over the container, the truck cover system comprising:

a pair of nonlinear arms, each of said arms having a first end engaged with said support structure and a second end secured to said first end of said flexible cover, each of said arms being movable in unison from a first position to a second position, each of said arms including an elongate base member slidably engaged with an elongate extension member, said extension member of each arm having a first elongate portion disposed at an obtuse angle with respect to a second elongate portion, said second elongate portion of said extension member of each arm being substantially parallel, noncoaxial, and in slidable engagement with said base member of each arm, and each of said first elongate portion of said extension member being secured to said first end of said flexible cover;

a first actuator associated with each of said nonlinear arms, each said first actuator of each arm linking said support structure to said elongate base member of each of said arms and being actuatable to move said arms from said first position to said second position; and a second actuator associated with each of said nonlinear arms, each said second actuator of each arm linking said elongate base member with said elongate extension member of each arm and being actuatable to move said elongate extension member of each arm longitudinally with respect to said elongate base member of each arm.

8. The truck cover system of claim 7, wherein said arms define an arcuate path with respect to said container upper edge during a transition from said first position to said second position.

9. The truck cover system of claim 7, further including a gantry affixed to a truck frame and adapted for supporting said flexible cover.

10. The truck cover system of claim 9, wherein said gantry is telescopic.

11. The truck cover system of claim 7, wherein each of said arms further includes a slide strip disposed between said base member and said extension member second portion of each arm.

12. The truck cover system according to claim 7, wherein each of said arms further includes a first retainer affixed to a first end of said base member of each arm for retaining said base member and said extension member of each arm in slidable engagement.

13. The truck cover system according to claim 12, wherein said first retainer of each arm includes a plurality of channels each joined with a corresponding back-up plate, wherein said channels and a slide strip of each arm surround a part of said second portion of said extension member of each arm.

14. The truck cover system according to claim 13, wherein a tension applied to said extension member of each arm by said first retainer channels of each arm can be manipulated.

15. The truck cover system according to claim 12, wherein each of said arms further includes a second retainer affixed to said extension member of each arm for retaining said base member and said extension member of each arm in slidable engagement.

16. The truck cover system according to claim 7, wherein said support structure is in mechanical communication with a truck frame.

17. A truck container cover system, said system affixed to a truck frame by a support structure, for covering a container having an opening defined by an upper edge of the container with a flexible cover having a first end and a second end, said system comprising:

at least one elongate, nonlinear, movable arm having a first end engaged to said support structure and a second end secured to said first end of said flexible cover, said at least one arm including an elongate base member and an elongate extension member, said extension member having an elongate first portion disposed at an obtuse angle and an elongate second portion, said second portion of said extension member being in noncoaxial parallel juxtaposition with said base member wherein said extension member second portion moves axially with respect to said base member, a slide strip disposed between said base member and said extension member second portion, and a first retainer affixed to said at least one movable arm adapted for retaining said base member and said extension member in said juxtaposition;

a first actuator associated with each said at least one arm, each said first actuator linking said support structure to said elongate base member of said arm and being actuatable to move said arm; and a second actuator associated with each said at least one arm, each said second actuator linking said elongate base member with said elongate extension member and being actuatable to move said elongate extension member axially with respect to said elongate base member;

wherein said first and second actuators move said at least one movable arm from a position wherein said base member is substantially horizontal with respect to said truck frame, to a position wherein said base member defines an obtuse angle with respect to said position horizontal to said truck frame.

18. The truck container cover system according to claim 17, wherein an end of said at least one movable arm proximate said cover defines a arcuate path from one end of said container opening to an opposite end.

19. The truck container cover system according to claim 17, wherein said first retainer is affixed to said extension member second portion and has said base member slidably extending therethrough, said first retainer including a plurality of channels, each in mechanical communication with a corresponding back-up plate, for applying an adjustable tension to said base member.

20. The truck container cover system according to claim 17, wherein said at least one movable arm is secured to said support structure affixed to said truck frame.

\* \* \* \* \*